US010727917B2

(12) United States Patent
Athley et al.

(10) Patent No.: US 10,727,917 B2
(45) Date of Patent: Jul. 28, 2020

(54) BEAMFORMING OF BEAMS

(71) Applicant: Telefonaktiebolaget LM Ericsson (publ), Stockholm (SE)

(72) Inventors: Fredrik Athley, Kullavik (SE); Sven Petersson, Sävedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 230 days.

(21) Appl. No.: 15/521,772

(22) PCT Filed: Sep. 21, 2016

(86) PCT No.: PCT/EP2016/072425
§ 371 (c)(1),
(2) Date: Apr. 25, 2017

(87) PCT Pub. No.: WO2018/054459
PCT Pub. Date: Mar. 29, 2018

(65) Prior Publication Data
US 2019/0103906 A1    Apr. 4, 2019

(51) Int. Cl.
*H04B 7/06* (2006.01)
*H04B 7/0452* (2017.01)

(52) U.S. Cl.
CPC ......... *H04B 7/0617* (2013.01); *H04B 7/0452* (2013.01); *H04B 7/0604* (2013.01); *H04B 7/0695* (2013.01)

(58) Field of Classification Search
CPC ... H04W 16/28; H04B 7/0617; H04B 7/0695; H04B 7/088; H04B 7/0452
See application file for complete search history.

(56) References Cited

U.S. PATENT DOCUMENTS

| | | | |
|---|---|---|---|
| 2003/0114195 A1* | 6/2003 | Chitrapu | H01Q 1/246 455/562.1 |
| 2013/0286960 A1* | 10/2013 | Li | H04W 72/042 370/329 |
| 2015/0003343 A1* | 1/2015 | Li | H04W 52/42 370/329 |
| 2016/0301466 A1* | 10/2016 | Kinamon | H04B 7/2628 |
| 2017/0104517 A1* | 4/2017 | Kakishima | H04B 7/0456 |
| 2018/0048442 A1* | 2/2018 | Sang | H04B 17/318 |
| 2018/0176065 A1* | 6/2018 | Deng | H04B 7/0695 |

(Continued)

FOREIGN PATENT DOCUMENTS

| | | |
|---|---|---|
| WO | 2011/050866 A1 | 5/2011 |
| WO | 2016/142281 A1 | 9/2016 |

*Primary Examiner* — Aristocratis Fotakis
(74) *Attorney, Agent, or Firm* — Rothwell, Figg, Ernst & Manbeck, P.C.

(57) ABSTRACT

There is provided mechanisms for beamforming of beams. A method is performed by a radio transceiver device. The method comprises performing beamforming by switching between communicating in a first set of beam patterns and in a second set of beam patterns. The first set of beam patterns and the second set of beam patterns comprise equally many beams. Signals in the beams are communicated with a first set of other radio transceiver devices in the first set of beam patterns and with a second set of other radio transceiver devices in the second set of beam patterns. The first set of other radio transceiver devices and the second set of other radio transceiver devices at least partly overlaps.

20 Claims, 5 Drawing Sheets

(a)

(b)

(56) References Cited

U.S. PATENT DOCUMENTS

2018/0248601 A1* 8/2018 Kishiyama ............ H04W 16/28
2018/0310137 A1* 10/2018 Mouhouche ......... H04B 7/0617
2018/0310323 A1* 10/2018 He ...................... H04W 72/046

* cited by examiner (a) (b)

(a) (b)

BEAMFORMING OF BEAMS

CROSS REFERENCE TO RELATED APPLICATION(S)

This application is a 35 U.S.C. § 371 National Stage of International Patent Application No. PCT/EP2016/072425, filed Sep. 21, 2016, designating the United States, the disclosure of which is incorporated by reference.

TECHNICAL FIELD

Embodiments presented herein relate to a method, a radio transceiver device, a computer program, and a computer program product for beamforming of beams.

BACKGROUND

In communications networks, there may be a challenge to obtain good performance and capacity for a given communications protocol, its parameters and the physical environment in which the communications network is deployed.

For example, with so-called massive multiple-input multiple-output (MIMO) systems, hundreds or more of antenna elements could be used at the radio base stations (RBS) as compared to only a few antennas as used by RBSs in current communications network. The large number of antenna elements could be used to obtain high signal-to-interference-and-noise ratio (SINR) thanks to high a beamforming gain and high spectral efficiency through spatial multiplexing of user terminals served by the RBSs (so called MU-MIMO, where MU is short for multi-user).

One approach to massive MIMO is to use a grid-of-beams (GoB) at the RBS for transmitting signals to the user terminals. The GoB typically consists of a number of predetermined fixed beams with beamforming weights obtained from a, possibly oversampled, Discrete Fourier Transform (DFT) matrix. In order not to lose any information in the data collected by the antenna elements, the number of beams in the GoB should be at least as many as the number of antenna elements. This means that the number of beams in the GoB of a potential massive MIMO system could be several hundreds.

A single user terminal can be served by one or multiple such beams. Since the beams in a massive MIMO GoB typically are very narrow, multiple beams may be required in order track user terminal movements and abrupt changes in dominating propagation paths due to, e.g., sudden obstruction of the line-of-sight (LoS) path. Multiple beams per user terminal can also be useful for other properties such as diversity, maximum ratio transmission, interference rejection, and spatial multiplexing.

For each active beam serving a user terminal, a digital baseband chain is needed to perform the required digital signal processing operations. The digital-valued in-phase and quadrature (I/Q) samples need also be transported from the associated radio units via some data interface, e.g., a Common Public Radio Interface (CPRI).

With hundreds of beams in the GoB it may not be feasible to connect a digital baseband chain to each beam in the GoB, since the digital signal processing hardware is comparatively expensive and consumes a comparatively large amount of power. Furthermore, the requirements on the data interface between the radio unit and baseband units may become prohibitive. Therefore, there could be much fewer baseband chains than beams in the GoB. However, this will limit the number of user terminals that can be served simultaneously when MU-MIMO is used.

One way to address this situation is to restrict the number of beams serving a single user terminal to one. However, this could cause issues in a dynamic environment where the user terminal moves and when dominating propagation paths suddenly might change. Since the beam in a massive MIMO GoB could be very narrow, such a system will be very sensitive to small changes if only a single, narrow, beam per user terminal is used.

Further, as user terminals are likely to adapt features and properties similar to those of RBS (such as number of antenna elements) and may thus be enabled to perform beamforming, it is foreseen that the same issues can appear during transmissions from user terminal to RBS and in side-communications from one user terminal to another user terminal and thus in general between two radio transceiver devices.

Hence, there is still a need for improved handling of resources when using beams in a GoB.

SUMMARY

An object of embodiments herein is to provide efficient handling of resources when using beams in a GoB.

According to a first aspect there is presented a method for beamforming of beams. The method is performed by a radio transceiver device. The method comprises performing beamforming by switching between communicating a first set of beam patterns and in a second set of beam patterns. The first set of beam patterns and the second set of beam patterns comprise equally many beams. Signals in the beams are communicated with a first set of other radio transceiver devices in the first set of beam patterns and with a second set of other radio transceiver devices in the second set of beam patterns. The first set of other radio transceiver devices and the second set of other radio transceiver devices at least partly overlaps.

Advantageously this provides efficient beamforming of beams. The disclosed beamforming can be used for efficient handling of resources when using beams in a GoB.

Advantageously this enables capacity in a communications system deploying such a radio transceiver device to be increased by enabling spatial multiplexing of more radio transceiver device with a limited number of baseband chains. Advantageously this enables fast scheduling of services whilst requiring low latency.

According to a second aspect there is presented a radio transceiver device for beamforming of beams. The radio transceiver device comprises processing circuitry. The processing circuitry is configured to cause the radio transceiver device to perform beamforming by switching between communicating in a first set of beam patterns and in a second set of beam patterns. The first set of beam patterns and the second set of beam patterns comprise equally many beams. Signals in the beams are communicated with a first set of other radio transceiver devices in the first set of beam patterns and with a second set of other radio transceiver devices in the second set of beam patterns. The first set of other radio transceiver devices and the second set of other radio transceiver devices at least partly overlaps.

According to a third aspect there is presented a radio transceiver device for beamforming of beams. The radio transceiver device comprises processing circuitry and a computer program product. The computer program product stores instructions that, when executed by the processing circuitry, causes the radio transceiver device to perform beamforming by switching between communicating in a first set of beam patterns and in a second set of beam patterns. The first set of beam patterns and the second set of beam patterns comprise equally many beams. Signals in the beams are communicated with a first set of other radio transceiver devices in the first set of beam patterns and with a second set of other radio transceiver devices in the second set of beam patterns. The first set of other radio transceiver devices and the second set of other radio transceiver devices at least partly overlaps.

According to a fourth aspect there is presented a radio transceiver device for beamforming of beams. The radio transceiver device comprises a transmit module configured to perform beamforming by switching between communicating in a first set of beam patterns and in a second set of beam patterns. The first set of beam patterns and the second set of beam patterns comprise equally many beams. Signals in the beams are communicated with a first set of other radio transceiver devices in the first set of beam patterns and with a second set of other radio transceiver devices in the second set of beam patterns. The first set of other radio transceiver devices and the second set of other radio transceiver devices at least partly overlaps.

According to some embodiments the radio transceiver device is, or is part of, an access node. According to some embodiments the radio transceiver device is, or is part of, a wireless device.

According to a fifth aspect there is presented a computer program for beamforming of beams, the computer program comprising computer program code which, when run on a radio transceiver device, causes the radio transceiver device to perform a method according to the first aspect.

According to a sixth aspect there is presented a computer program product comprising a computer program according to the fifth aspect and a computer readable storage medium on which the computer program is stored. The computer readable storage medium could be a non-transitory computer readable storage medium.

It is to be noted that any feature of the first, second, third, fourth, fifth and sixth aspects may be applied to any other aspect, wherever appropriate. Likewise, any advantage of the first aspect may equally apply to the second, third, fourth, fifth and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
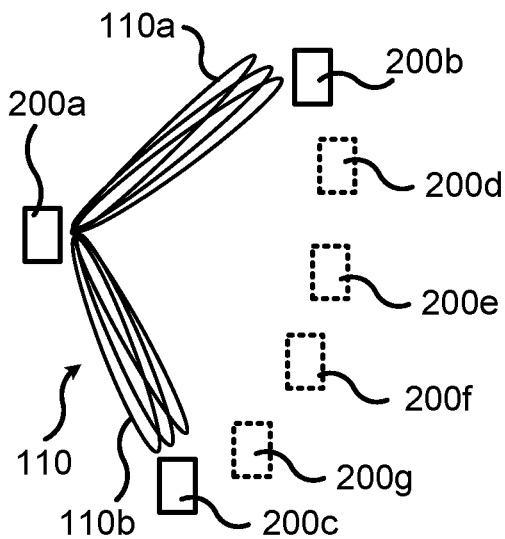
FIGS. 1, 2, and 3 are schematic diagrams illustrating communications systems according to embodiments.
Figure 1:
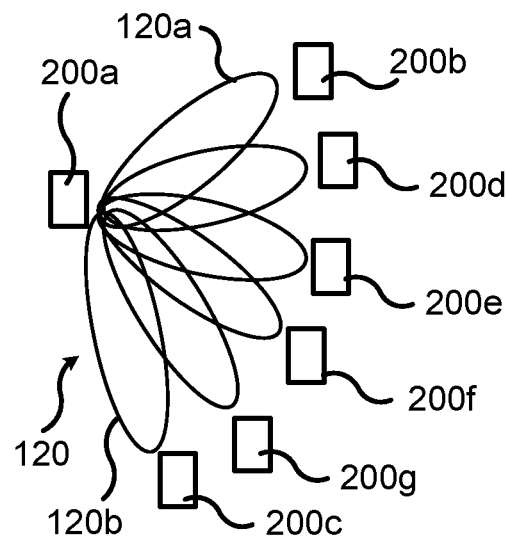
Figure 2:
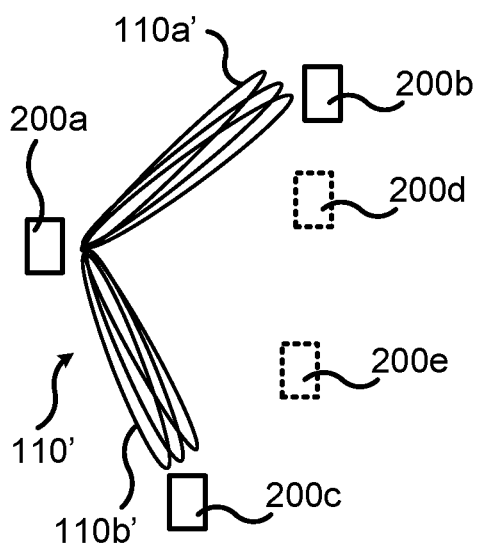
Figure 2:
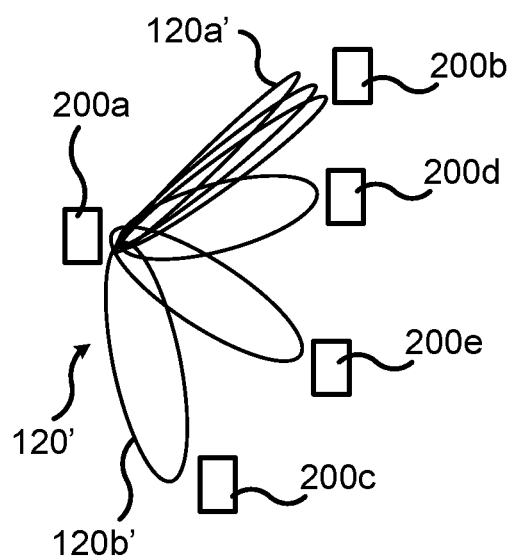
Figure 3:
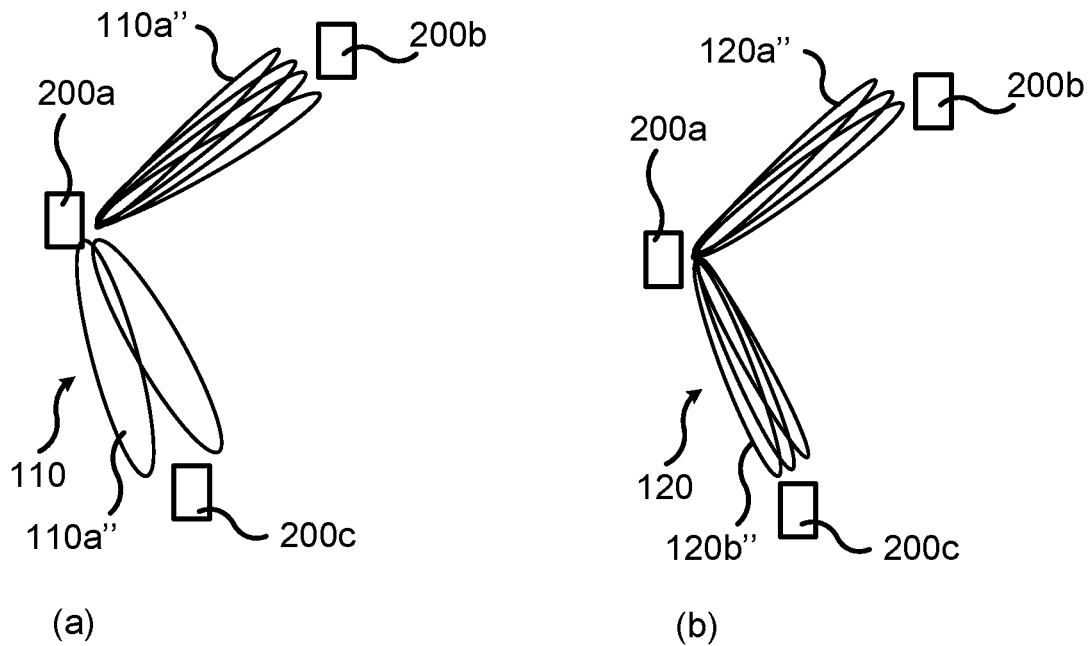

FIGS. 1, 2, and 3 at (a) schematically illustrate a radio transceiver device 200a transmitting in beams 110a, 110b, 110a', 110b', 110a", 110b" in respective first sets of beam patterns 110, 110', 110" to two other radio transceiver devices 200b, 200c. The radio transceiver device 200a could be an access node, such as a radio access network node, radio base station, base transceiver station, node B, evolved node B, or access point, or a wireless device, such as a portable wireless device, mobile station, mobile phone, handset, wireless local loop phone, user equipment (UE), smartphone, laptop computer, or tablet computer.

It could be that the situation changes such that more other radio transceiver devices 200d, 200e, 200f, 200g are to communicate with the radio transceiver device 200a or that one of the other radio transceiver devices 200b, 200c requires more or less transmission resources. Assuming that the radio transceiver device 200a fully utilizes all available signal processing resource and hence cannot start transmitting in any further beams without first stop transmitting in a current beam. Thus, for the illustrative examples of FIGS. 1(a), 2(a), and 3(a), the radio transceiver device 200a has only signal processing resources corresponding to six baseband chains. This means that no more other radio transceiver device can simultaneously be served with the available baseband resources.

In FIGS. 1(a) and 2(a) assume for illustrative purposes that two radio transceiver devices 200b, 200c are served by three narrow beams 110a, 110b, 110a', 110b' each.

In FIG. 1(a), if four additional radio transceiver devices 200d, 200e, 200f, 200g need data the radio transceiver devices 200d, 200e, 200f, 200g cannot be spatially multiplexed with radio transceiver devices 200b, 200c due to the limited amount of baseband resources if a conventional GoB solution is used. According to the herein disclosed embodiments, as illustrated in FIG. 1(b), the two sets of three narrow beams serving radio transceiver devices 200b, 200c are each replaced by a wide beam, thereby releasing four baseband chains that can be used for serving radio transceiver devices 200d, 200e, 200f, 200g, each with a single wide beam. Although the user throughput for radio transceiver devices 200b, 200c may be somewhat reduced by this approach, overall system capacity can increase.

In FIG. 2(a), if two additional radio transceiver devices 200d, 200e need data the radio transceiver devices 200d, 200e, 200f, 200g cannot be spatially multiplexed with radio transceiver devices 200b, 200c due to the limited amount of baseband resources if a conventional GoB solution is used. According to the herein disclosed embodiments, as illustrated in FIG. 2(b), the three narrow beams are replaced by one wide beam for radio transceiver device 200c but not for radio transceiver device 200b. One reason for this could be that, as in this example, there is only need for releasing two baseband chains so that radio transceiver devices 200d, 200e can be served. Another reason could be that there may be an unacceptable performance reduction for radio transceiver device 200a when replacing three narrow beams by one wide.

In FIG. 3(a) assume for illustrative purposes that radio transceiver devices 200b, 200c are served by four and three narrow beams 110a", 110b", respectively.

In FIG. 3(a), if more beams are needed for serving radio transceiver device 200c, radio transceiver devices 200c cannot be spatially multiplexed with radio transceiver device 200b due to the limited amount of baseband resources if a conventional GoB solution is used. According to the herein disclosed embodiments, as illustrated in FIG. 3(b), the four narrow beams for radio transceiver devices 200b are replaced by three narrow beams and the two wide beams for radio transceiver devices 200c are replaced by three narrow beams.

The herein disclosed embodiments enable multiple narrow beams that are serving a radio transceiver device to be replaced with a single wide beam serving that radio transceiver device. This will release baseband resources that can be used to serve other radio transceiver devices, thereby increasing potential MU-MIMO gains. It can also be useful for fast scheduling of services that require low latency, since more radio transceiver devices can be scheduled simultaneously by spatial multiplexing. Compared to a single narrow beam, using a wide beam will be more robust to movements of the radio transceiver devices and changes in dominating propagation paths.

The herein disclosed embodiments enable the radio transceiver device 200a to perform beamforming by selectively switching between transmitting in the first set of beam patterns 110, 110', 110" and in the second a of beam patterns 120, 120', 120". FIGS. 1, 2, and 3 at (b) schematically illustrate the radio transceiver device 200a transmitting in beams 120a, 120b, 120a', 120b', 120a", 120b" in respective second sets of beam patterns 120, 120', 120" to other radio transceiver devices 200b, 200c, 200d, 200e, 200f, 200g.

As will be further disclosed below, embodiments disclosed herein enable beam widths and beam allocation in a GoB-based massive MIMO system to be adaptively adjusted according to the available baseband/interface resources in the radio transceiver device 200a and the current traffic needs. When only a few other radio transceiver devices need to be served simultaneously these can be served by multiple, narrow, beams having the intrinsic beam width of the antenna array of the radio transceiver device 200a. When there is a need for serving many radio transceiver device 200as simultaneously, the multiple narrow beams are replaced by a single wide beam for all or for some of the radio transceiver device 200as.

The embodiments disclosed herein relate to mechanisms for beamforming of beams. In order to obtain such mechanisms there is provided a radio transceiver device 200a, a method performed by the radio transceiver device 200a, a computer program product comprising code, for example in the form of a computer program, that when run on a radio transceiver device 200a, causes the radio transceiver device 200a to perform the method.

Figure 4:
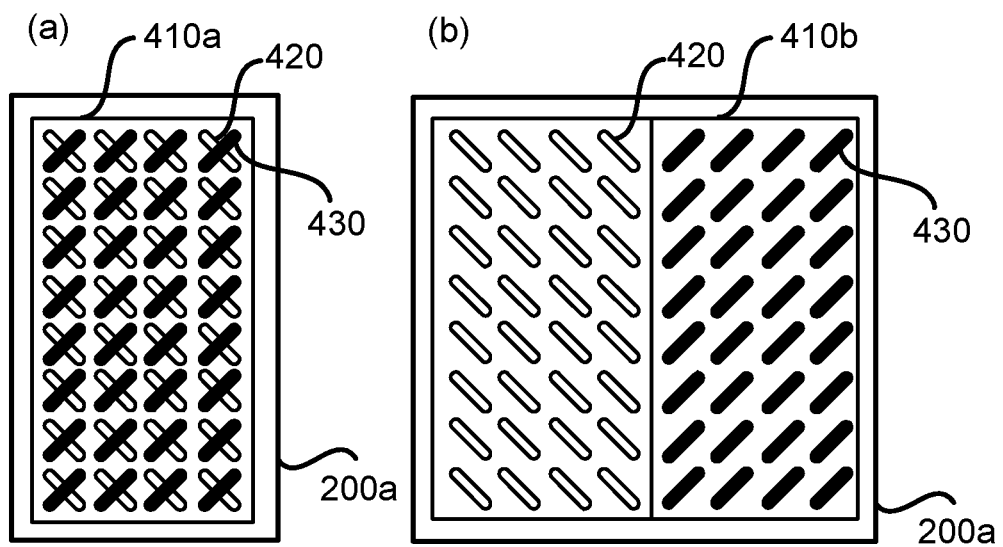
FIG. 4 schematically illustrates an array antenna architecture of a radio transceiver device according to an embodiment.

According to an embodiment the radio transceiver device 200a comprises an array antenna architecture consisting of a number of pairs of radiating elements where the elements in each pair have identical radiation pattern and orthogonal polarization. Two examples of array antenna architecture structures that fulfill these conditions are shown in FIGS. 4 (a) and (b). FIG. 4 at (a) and (b) illustrate example array antenna architectures 410a, 410b of the radio transceiver device 200a. Each antenna element comprises two sub-elements 420, 430 having orthogonal polarizations in all directions (of interest). Typically these two sub-elements 420, 430 are located at the same position, as in FIG. 4(a), but they can as well be displaced in relation to each other, as in FIG. 4(b). The array antenna architecture in FIG. 4(a) is a uniform rectangular array (URA) with ±45° polarized elements. The array antenna architecture in FIG. 4(b) consists of two panels where each panel is a URA of single-polarized antenna elements and the corresponding elements in the two panels have orthogonal polarization. To create beams with variable beam width, antenna elements with orthogonal polarization are combined with judiciously chosen weights. The radio transceiver device 200a is configured to generate at least one virtual antenna port pair per set of beam patterns using the physical antenna elements 420, 430. Each virtual antenna port in the at least one virtual antenna port pair is obtained by combining physical antenna elements 420, 430 having orthogonal polarization such that two virtual antenna ports in each virtual antenna port pair have identical power radiation patterns and orthogonal polarizations, and wherein at least one antenna element 420, 430 per polarization has a non-zero weight. This property will hereinafter be denoted as dual-polarization beamforming (DPBF). By combing elements with orthogonal polarization, the combination becomes incoherent instead of coherent as in conventional beamforming methods where antenna elements with same polarization are combined. In this way, different beam widths ranging from the intrinsic beam width of the array (a beam created by a weight vector consisting of all ones) to the beam width of a single radiating element using constant modulus weights can be created. This means that different beam widths can be obtained without any loss of power amplifier (PA) utilization, as would be the case with prior art methods based on amplitude tapering or antenna selection.

Figure 5:
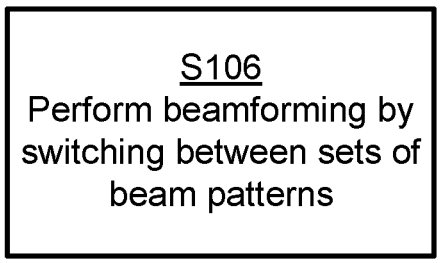
FIGS. 5, 6, and 7 are flowcharts of methods according to embodiments.
Figure 6:
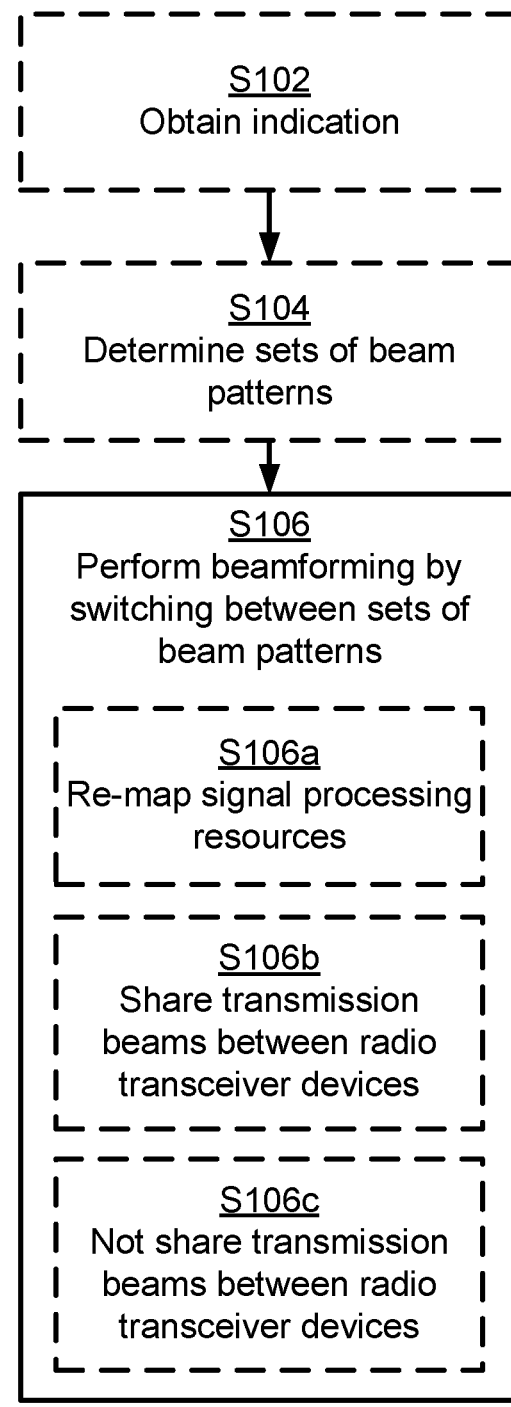

FIGS. 5 and 6 are flow charts illustrating embodiments of methods for beamforming of beams. The methods are performed by the radio transceiver device 200a. The methods are advantageously provided as computer programs 1020.

Reference is now made to FIG. 5 illustrating a method for beamforming of beams as performed by the radio transceiver device 200a according to an embodiment.

S106: The radio transceiver device 200a performs beamforming by switching between communicating in a first set of beam patterns 110, 110', 110" and in a second set of beam patterns 120, 120', 120". In this respect, communicating means at least one of transmitting and receiving, respectively.

The first set of beam patterns and the second set of beam patterns comprise equally many beams 110a, 110a', 110a", 110b, 110b', 110b", 120a, 120a', 120a", 120b, 120b', 120b".

Signals in the beams are communicated with a first set of other radio transceiver devices 200b, 200c, 200d, 200e, 200f, 200g in the first set of beam patterns and with a second set of other radio transceiver devices 200b, 200c, 200d, 200e, 200f, 200g in the second set of beam patterns. Signals in the beams could thus be transmitted to the first set of other radio transceiver devices 200b, 200c, 200d, 200e, 200f, 200g in the first set of beam patterns and to the second set of other radio transceiver devices 200b, 200c, 200d, 200e, 200f, 200g in the second set of beam patterns. Signals in the beams could thus be received from the first set of other radio transceiver devices 200b, 200c, 200d, 200e, 200f, 200g in the first set of beam patterns and from the second set of other radio transceiver devices 200b, 200c, 200d, 200e, 200f, 200g in the second set of beam patterns.

The first set of other radio transceiver devices 200b, 200c, 200d, 200e, 200f, 200g and the second set of other radio transceiver devices 200b, 200c, 200d, 200e, 200f, 200g at least partly overlaps.

The beamforming in step S106 enables the radio transceiver device 200a to dynamically adjust beam widths and beam allocation. In turn this enables an efficient allocation of baseband resources for serving the other radio transceiver devices 200b, 200c, 200d, 200e, 200f, 200g.

The beamforming in step S106 enables the radio transceiver device 200a to dynamically adapt the beams in a GoB beamforming system to available baseband processing and data interface resources.

Embodiments relating to further details of beamforming of beams as performed by the radio transceiver device 200a will now be disclosed.

Reference is now made to FIG. 6 illustrating methods for beamforming of beams as performed by the radio transceiver device 200a according to further embodiments. It is assumed that step S106 is performed as described above with reference to FIG. 5 and a thus repeated description thereof is therefore omitted.

There may be different triggers for when the radio transceiver device 200a is to perform the beamforming in step S106. According to some aspects a beamforming switch is triggered when the requested amount of baseband resources exceeds available resources. For illustrative purposes, assume that one of the first set of beam patterns and the second set of beam patterns is used as a current beam pattern. According to an embodiment the radio transceiver device 200a is then configured to perform step S102 in order for the beamforming in step S106 to be triggered:

S102: The radio transceiver device 200a obtains an indication that the current set of beam patterns does not meet a performance metric. The beamforming in step s106 is then performed in response thereto to switch from the current set of beam patterns to the set of beam patterns not used as the current set of beam patterns.

A baseband resource allocation and beam broadening can thereby be triggered when the requested amount of baseband resources exceeds the available resources, e.g., when the total number of desired transmission/reception layers exceeds the number of baseband chains.

According to some aspects the sets of beam patterns are fixed and hence the radio transceiver device 200a can be configured to, from a pool of fixed sets of beam patterns, select the set of beam patterns that maximizes some performance criterion. According to other aspects the sets are adaptively determined based on the other radio transceiver device 200b-200g, such as their geographical relation to the radio transceiver device 200a and/or their traffic demands. Hence, according to an embodiment the radio transceiver device 200a is configured to perform step S104:

S104: The radio transceiver device 200a determines the set of beam patterns not used as the current set of beam patterns based on the performance metric before switching from the current set of beam patterns to the set of beam patterns not used as the current set of beam patterns.

There may be different ways for the radio transceiver device 200a to determine the set of beam patterns not used as the current set of beam patterns. In more detail, the performance of each other radio transceiver device 200b-200g can by the radio transceiver device 200a be estimated for different baseband allocation hypotheses, each corresponding to its own set of beam pattern. The baseband allocation hypothesis for which the performance metric is best is selected and the corresponding set of beam patterns is used.

There can be different examples of performance metrics. According to an embodiment the selection of which radio transceiver device 200b-200g to perform a beam replacement for can be based on, e.g., estimated system capacity, user throughput, latency, fairness, current experienced throughput, channel stationarity, and/or predicted performance degradation of that radio transceiver devices 200b-200g for which a beam is replaced, or adapted (in terms of beam width and direction). For example, user throughput can be estimated based on the hypothesized number of layers and the estimated SNR/SINR for each layer, taking the impact of different beam widths into account. For example, doubling the beam width will result in 3 dB lower SNR if this is not compensated for by increased transmission power. SINR can be estimated based on CQI and interference measurement reports. Fairness can be taken into account by comparing estimated user throughput and latency between different other radio transceiver devices 200b-200g for different baseband allocation hypotheses. Each needed performance of the other radio transceiver devices 200b-200g can also be taken into consideration. For example, a radio transceiver device 200b-200g with high SINR and high rank transmission may get acceptable performance even if the SINR and transmission rank is reduced. Then signal processing resources may be better to use for serving another of the radio transceiver devices 200b-200g with low latency requirement.

There may be different ways for the radio transceiver device 200a to perform the beamforming in step S106. Embodiments relating thereto will now be described in turn.

According to some aspects, signal processing resources available in the radio transceiver device 200a are re-allocated during the beamforming in step S106. Hence, according to an embodiment the radio transceiver device 200a comprises signal processing resources, and is configured to perform the beamforming by performing step S106a:

S106a: The radio transceiver device 200a re-maps the signal processing resources from one beam port to another beam port in order to switch between communicating (transmitting and/or receiving) in the first set of beam patterns 110, 110', 110" and in the second set of beam patterns 120, 120', 120".

According to some aspects the beamforming comprises splitting a set of beams from serving one of the other radio transceiver devices 200b-200g to serving two of the other radio transceiver devices 200b-200g. Hence, according to an embodiment the radio transceiver device 200a is configured to switch between communicating (transmitting and/or receiving) in the first set of beam patterns and in the second set of beam patterns by performing step S106b:

S106b: The radio transceiver device 200a splits two beams from belonging to one of the other radio transceiver devices 200*b*-200*g* to belonging to this one of the other radio transceiver devices 200*b*-200*g* and one further of the other radio transceiver devices 200*b*-200*g*.

According to some aspects the beamforming comprises merging beams from serving two of the other radio transceiver devices 200*b*-200*g* to serving one of the other radio transceiver devices 200*b*-200*g*. Hence, according to an embodiment the radio transceiver device 200*a* is configured to switch between communicating (transmitting and/or receiving) in the first set of beam patterns and in the second set of beam patterns by performing step S106*c*:

S106*c*: The radio transceiver device 200*a* merges two beams from belonging to two of the other radio transceiver devices 200*b*-200*g* to belonging to one of these two of the other radio transceiver devices 200*b*-200*g*.

As disclosed above, the first set of other radio transceiver devices 200*b*-200*g* and the second set of other radio transceiver devices 200*b*-200*g* at least partly overlaps. This implies that there is at least one of other radio transceiver devices 200*b*-200*g* that belongs to both sets. Further, each of the sets could comprise equally many or unequally many other radio transceiver devices 200*b*-200*g*. Hence, according to an embodiment signals in the beams are communicated with (transmitted to and/or received from) unequally many of the other radio transceiver devices 200*b*-200*g* in the first set of beam patterns and in the second set of beam patterns. In the illustrative examples of FIGS. 1 and 2 there are unequally many of the other radio transceiver devices 200*b*-200*g* in the first set of beam patterns and in the second set of beam pattern, whereas in the illustrative example of FIG. 3 there are equally many of the other radio transceiver devices 200*b*-200*c* in the first set of beam patterns and in the second set of beam pattern.

Further, according to some aspects the beams for one (first) radio transceiver device 200*b*-200*g* served by the first set of transmission patterns are divided between this (first) radio transceiver device 200*b*-200*g* and at least one other (second) radio transceiver device 200*b*-200*g* in second set of transmission patterns. Hence, according to an embodiment the first set of beam patterns comprises communicating (transmitting and/or receiving) in all beams of a first set of beams comprising at least two beams with at least one of the other radio transceiver devices 200*b*-200*g*, and the second set of beam patterns comprises communicating (transmitting and/or receiving) in less than all beams of the first set of beams with this one of the other radio transceiver devices 200*b*-200*g* and communicating (transmitting and/or receiving) in the remaining beams of the first set of beams with at least one other of the other radio transceiver devices 200*b*-200*g*.

According to some aspects different beam widths are used to serve the radio transceiver device 200*b*-200*g* in the different beam patterns. Hence, according to an embodiment the beams communicated in with (transmitted to and/or received from) one of the other radio transceiver devices 200*a*-200*g* in the first set of beam patterns and the beams communicated in with (transmitted to and/or received from) thus one of the other radio transceiver devices 200*b*-200*g* in the second set of beam patterns have mutually unequal beam widths. The same could apply also to more than one of the other radio transceiver devices 200*b*-200*g*.

There could be different ways to determine the beam widths and beam pointing directions for the other radio transceiver devices 200*b*-200*g*. For example, at least one of the beam widths and the beam pointing directions could be determined based on estimated angular spread relative the radio transceiver device 200*a* and the other radio transceiver device 200*b*-200*g*. This is estimated by comparing uplink (UL) received power in adjacent narrow beams based on sounding reference signals (SRS) or data transmissions from the other radio transceiver device 200*b*-200*g*. For example, at least one of the beam widths and the beam pointing directions could be determined based on estimated mobility of the other radio transceiver device 200*b*-200*g*. Mobility could be estimated based on beam reference signal (BRS) reference signal received power (RSRP) reports and possibly also position reference signals. If BRS RSRP reports show frequent changes in best serving beams the beam should be sufficiently broad. For example, at least one of the beam widths and the beam pointing directions could be determined based on directions estimated from SRS received in the narrow BRS beams, RBS RSRP reports, and/or UL data transmissions. This information can be complemented with interference measurement reports in order to determine beam pointing directions that create less interference than given by an interference threshold value. If the sets of transmission patterns are two-dimensional, i.e., in both azimuth and elevation, the herein disclosed examples for determining at least one of the beam widths and the beam pointing directions can be applied either jointly or separately in each dimension. For example, if the other radio transceiver device 200*b*-200*g* moves only in an azimuth plane relative the radio transceiver device 200*a*, a beam broadening may be triggered in the azimuth dimension whilst keeping the beams in the elevation dimension.

According to some aspects there are different power allocations to beams in the different beam patterns. In more detail, when there is a mix of narrow and wide beams, relatively more power could be allocated to the comparatively wide beams in order compensate the reduced beamforming gain. Hence, according to an embodiment the mutually unequal beam widths and the mutually unequal power allocations are defined such that the beams with wide beam widths are allocated more power per beam than the beams with narrow beam widths. In this way, constant effective isotropically radiated power (EIRP) can be achieved. With the proposed antenna array architecture, this re-allocation of power between beams can be achieved without loss of PA utilization. Correspondingly for the UL, the radio transceiver device 200*a* can signal to the other radio transceiver devices 200*b*-200*g* that a change in antenna gain has been made and that the other radio transceiver devices 200*b*-200*g* should adjust their transmit power accordingly. Hence, according to an embodiment the beams communicated in with (transmitted to and/or received from) one of the other radio transceiver devices 200*b*-200*g* in the first set of beam patterns and the beams communicated in with (transmitted to and/or received from) this one of the other radio transceiver devices 200*b*-200*g* in the second set of beam patterns have mutually unequal power allocations. The same could apply also to more than one of the other radio transceiver devices 200*b*-200*g*.

Since the uplink (UL) transmission could be more demanding than downlink (DL) transmission with regard to requirements on, for example, data interface, the beam widths may be different in downlink (DL) and UL so that the amount of data reduction can be different in UL and DL. Hence, according to an embodiment one of the first set of beam patterns and the second set of beam patterns is used for uplink reception and the other of the first set of beam patterns and the second set of beam patterns is used for downlink transmission.

There can be different ways for the radio transceiver device 200*a* to implement the transmission in the sets of beam patterns. According to some embodiments the radio transceiver device 200a comprises radio chains, and equally many of the radio chains are used in the first set of beam patterns and the second set of beam patterns. Further, according to an embodiment all of the radio chains are used in the first set of beam patterns and the second set of beam patterns. According to some embodiments the radio transceiver device 200a comprises power amplifiers, and equally many of the power amplifiers are used in the first set of beam patterns and the second set of beam patterns. Further, according to an embodiment all of the power amplifiers are fully used in the first set of beam patterns and the second set of beam patterns. Generating a set of beam patterns with beams having adjustable beam widths can be performed by a radio transceiver device 200a comprising an active antenna array architecture based on dual-polarization beamforming (DPBF), see above. This enables beam widening with full utilization of all PA of the radio transceiver device 200a. The DPBF antenna architecture consists of an active antenna array with dual-polarized elements where each element and polarization has its own PA. Generating beams with different beam widths can be accomplished where each beam can have two antenna ports having the same power pattern and orthogonal polarizations in all directions. Other examples to enable beam widening are also possible if some power loss is acceptable. Since all beams could use all PAs, more power can be allocated to the wide beams in order to compensate the reduced gain, without affecting the PA utilization.

The radio transceiver device 200a can be configured so that the allocation of baseband resources maximizes some system performance metric. One example is to maximize the sum rate of the traffic served by the radio transceiver device 200a. The radio transceiver device 200a can be configured to allocate baseband resources to multiple wide beams serving several other radio transceiver devices 200b-200g instead of allocating multiple narrow beams for a single other radio transceiver device 200b-200g if it increases the sum rate of the system. This may reduce the data rate for an individual other radio transceiver device 200b-200g but this reduction can in some cases be insignificant or unimportant, e.g. if sufficient quality of service can be attained with a single wide beam. A single beam can also serve multiple other radio transceiver devices 200b-200g with time/frequency sharing if this is sufficient to meet their traffic demand. The radio transceiver device 200a may further be configured to base its beamforming on fairness and latency. For some services, low latency may be more important than high data rate, e.g., critical machine type communication (C-MTC). In such cases, it may be advantageous to schedule many other radio transceiver devices 200b-200g simultaneously with low data rate instead of a few other radio transceiver devices 200b-200g simultaneously with high data rate. The radio transceiver device 200a can also take the beam width into consideration in order not to co-schedule other radio transceiver devices 200b-200g which have a small angular separation. The beam width can be adapted to the channel conditions and the mobility of the other radio transceiver devices 200b-200g. For example, if the channel angular spread is small and one of the other radio transceiver devices 200b-200g is stationary a narrower beam can be used than if the channel angular spread is large and this other one of the radio transceiver devices 200b-200g is moving.

Figure 7:
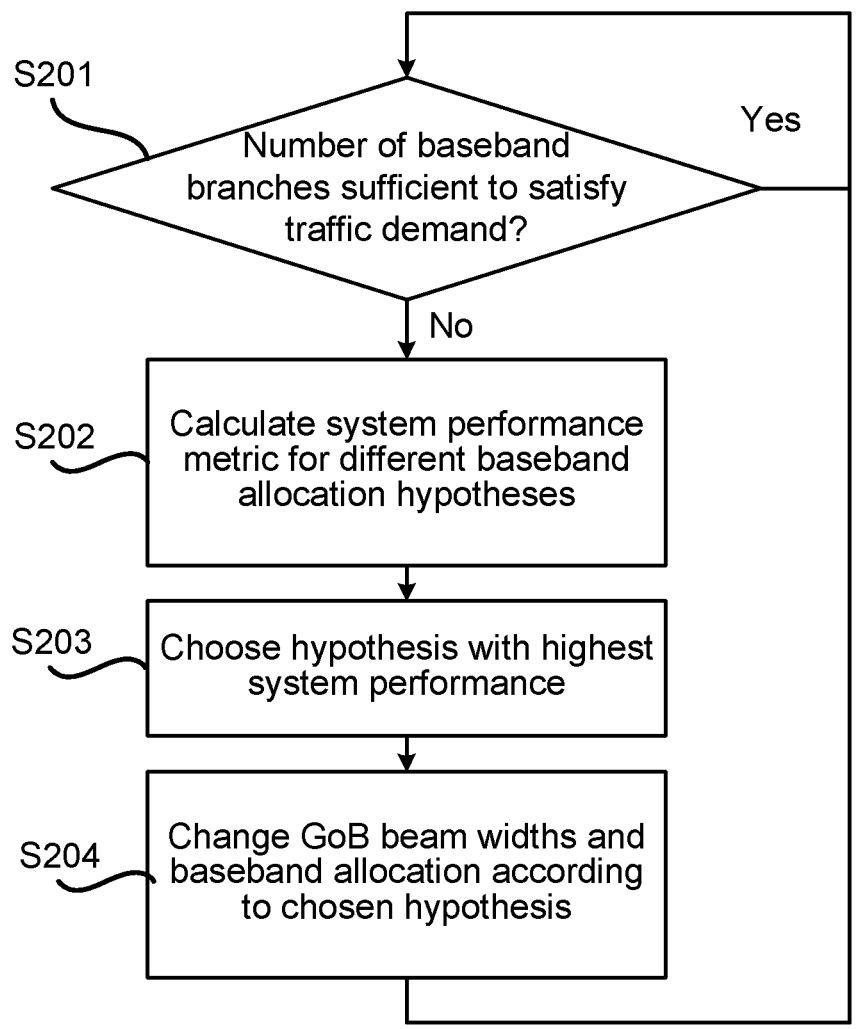

Reference is now made to FIG. 7. FIG. 7 is a flowchart of a particular embodiment for beamforming of beams.

S201: The radio transceiver device 200a checks whether or not the number of baseband branches is sufficient to satisfy its traffic demand. If no, step S202 is entered. Else, step S201 could be entered once again, possible after some delay. One way to implement step S201 is to perform step S102.

S202: The radio transceiver device 200a determines a system performance metric for different baseband allocation hypotheses, where each baseband allocation hypothesis corresponds to its own set of beam patterns. One way to implement step S202 is to perform step S104.

S203: The radio transceiver device 200a selects the baseband allocation hypothesis, and hence the set of beam patterns, with highest system performance. One way to implement step S203 is to perform step S104.

S204: The radio transceiver device 200a changes beam widths and baseband processing resource allocation according to selected baseband allocation hypothesis in order to switch to the selected set of beam patterns. Step S201 could then be entered once again, possible after some delay. One way to implement step S204 is to perform any of steps S106, s106a, S106b, S106c.

Figure 8:
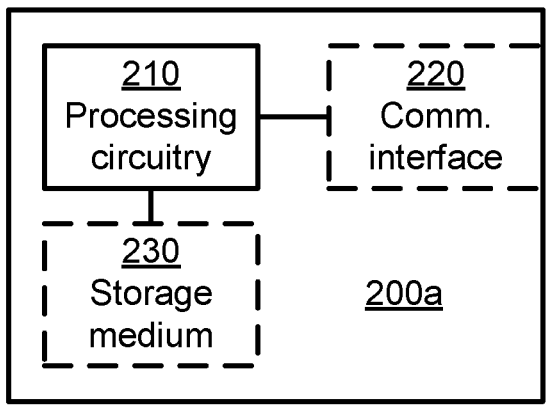
FIG. 8 is a schematic diagram showing functional units of a radio transceiver device according to an embodiment.

FIG. 8 schematically illustrates, in terms of a number of functional units, the components of a radio transceiver device 200a according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010 (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio transceiver device 200a to perform a set of operations, or steps, S102-S106, S201-S204, as disclosed above. For example, the storage medium 230 may store the set of operations, and the processing circuitry 210 may be configured to retrieve the set of operations from the storage medium 230 to cause the radio transceiver device 200a to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The radio transceiver device 200a may further comprise a communications interface 220 at least configured for communications with another radio transceiver device 200b-200g. As such the communications interface 220 may comprise one or more transmitters and receivers, comprising analogue and digital components. The processing circuitry 210 controls the general operation of the radio transceiver device 200a e.g. by sending data and control signals to the communications interface 220 and the storage medium 230, by receiving data and reports from the communications interface 220, and by retrieving data and instructions from the storage medium 230. Other components, as well as the related functionality, of the radio transceiver device 200a are omitted in order not to obscure the concepts presented herein.

Figure 9:
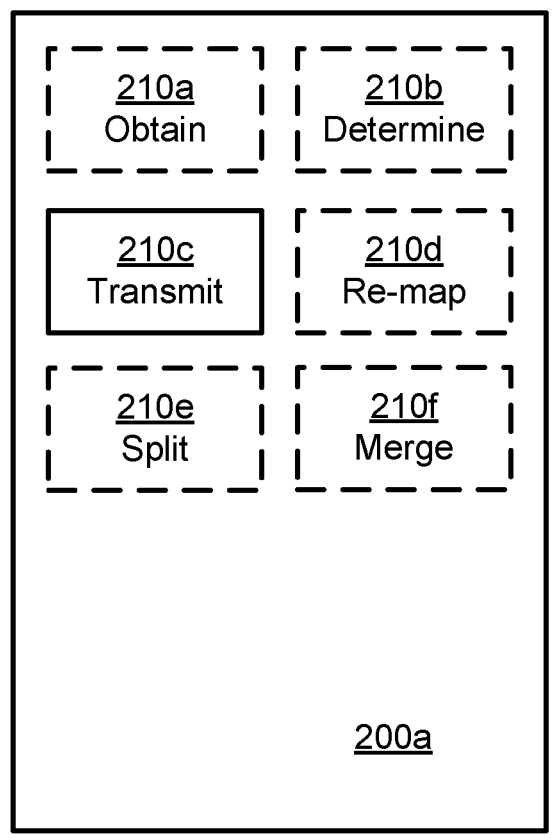
FIG. 9 is a schematic diagram showing functional modules of radio transceiver device according to an embodiment.

FIG. 9 schematically illustrates, in terms of a number of functional modules, the components of a radio transceiver device 200a according to an embodiment. The radio transceiver device 200a of FIG. 9 comprises a transmit module 210c configured to perform step S106. The radio transceiver device 200a of FIG. 9 may further comprises a number of optional functional modules, such as any of an module 210a configured to perform step S102, a determine module 210b configured to perform step S104, a re-map module 210d configured to perform step S106a, a split module 210e configured to perform step S106b, and a merge module 210f configured to perform step S106c. In general terms, each functional module 210a-210f may in one embodiment be implemented only in hardware and in another embodiment with the help of software, i.e., the latter embodiment having computer program instructions stored on the storage medium 230 which when run on the processing circuitry makes the radio transceiver device 200a perform the corresponding steps mentioned above in conjunction with FIGS. 8 and 9. It should also be mentioned that even though the modules correspond to parts of a computer program, they do not need to be separate modules therein, but the way in which they are implemented in software is dependent on the programming language used. Preferably, one or more or all functional modules 210a-210f may be implemented by the processing circuitry 210, possibly in cooperation with functional units 220 and/or 230. The processing circuitry 210 may thus be configured to from the storage medium 230 fetch instructions as provided by a functional module 210a-210f and to execute these instructions, thereby performing any steps as disclosed herein.

The radio transceiver device 200a may be provided as a standalone device or as a part of at least one further device. For example, the radio transceiver device 200a may be implemented in, part of, or co-located with, an access node or a wireless device. Hence, according to some aspects there is provided an access node and/or wireless device comprising a radio transceiver device 200a as herein disclosed.

Further, a first portion of the instructions performed by the radio transceiver device 200a may be executed in a first device, and a second portion of the of the instructions performed by the radio transceiver device 200a may be executed in a second device; the herein disclosed embodiments are not limited to any particular number of devices on which the instructions performed by the radio transceiver device 200a may be executed. Hence, the methods according to the herein disclosed embodiments are suitable to be performed by a radio transceiver device 200a residing in a cloud computational environment. Therefore, although a single processing circuitry 210 is illustrated in FIG. 8 the processing circuitry 210 may be distributed among a plurality of devices, or nodes. The same applies to the functional modules 210a-210f of FIG. 9 and the computer program 1020 of FIG. 10 (see below).

Figure 10:
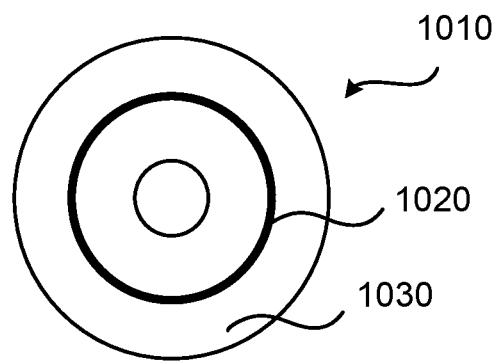
FIG. 10 shows one example of a computer program product comprising computer readable storage medium according to an embodiment.

FIG. 10 shows one example of a computer program product 1010 comprising computer readable storage medium 1030. On this computer readable storage medium 1030, a computer program 1020 can be stored, which computer program 1020 can cause the processing circuitry 210 and thereto operatively coupled entities and devices, such as the communications interface 220 and the storage medium 230, to execute methods according to embodiments described herein. The computer program 1020 and/or computer program product 1010 may thus provide means for performing any steps as herein disclosed.

In the example of FIG. 10, the computer program product 1010 is illustrated as an optical disc, such as a CD (compact disc) or a DVD (digital versatile disc) or a Blu-Ray disc. The computer program product 1010 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020 is here schematically shown as a track on the depicted optical disk, the computer program 1020 can be stored in any way which is suitable for the computer program product 1010.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for beamforming of beams, the method being performed by a serving radio transceiver device, the method comprising:
    performing beamforming by switching between communicating in a first set of beam patterns and in a second set of beam patterns,
    wherein the first set of beam patterns and the second set of beam patterns comprise equally many beams,
    wherein signals in said beams are communicated with a first set of radio transceiver devices in the first set of beam patterns and with a second set of radio transceiver devices in the second set of beam patterns, and
    wherein the first set of radio transceiver devices and the second set of radio transceiver devices at least partly overlap, wherein
    the first set of beam patterns comprises a first group of N beams, where N is greater than 1,
    the first set of radio transceiver devices comprises a first radio transceiver device,
    the second set of radio transceiver devices comprises a second radio transceiver device,
    the method further comprises, prior to the switching, using said N beams to serve the first radio transceiver device, and
    performing the switching comprises:
        (i) detecting a need to serve the second radio transceiver device;
        (ii) detecting a load condition of the serving radio transceiver device;
        (iii) determining whether the load condition satisfies a criteria; and
        (iv) as a result of detecting the need to serve the second radio transceiver device and determining that the load condition satisfies the criteria, a) reducing the number of beams that are used to serve the first radio transceiver device from said N beam to M beams, where M is less than N, and b) using P beams to serve the second radio transceiver device, wherein P is a positive integer that is greater than or equal to 1.

2. A method performed by a radio transceiver device, the method comprising:
    using N beams to serve a first user equipment (UE), N being greater than 1;
    detecting a need to serve a second UE;
    detecting a load condition of the radio transceiver device;
    determining whether the load condition satisfies a criteria; and
    as a result of detecting the need to serve the second UE and determining that the load condition of the radio transceiver device satisfies the criteria, a) reducing the number of beams that are used to serve the first UE from said N beam to M beams, where M is less than N and M is greater than or equal to 1, and b) using P beams to serve the second UE, P being a positive integer that is greater than or equal to 1.

3. The method of claim 2, the method further comprising switching between using a first set of beams to serve a first set of UEs and using a second set of beams to serve a second set of UEs, wherein
the first set of beams includes the N beams,
the second set of beams includes the M beams and the P beams,
the first set of UEs includes the first UE, and
the second set of UEs includes the first UE and the second UE.

4. The method of claim 3, wherein the number of UEs included in the first set of UEs and the number of UEs included in the second set of UEs are different.

5. The method of claim 3, wherein
the radio transceiver device comprises signal processing resources, and
the method comprises re-mapping the signal processing resources from one beam port to another beam port in order to switch between using the first set of beams and using the second set of beams.

6. The method of claim 2, further comprising:
switching between using a first set of beams to serve a first set of UEs and using a second set of beams to serve a second set of UEs, wherein
switching between using the first set of beams to serve the first set of UEs and using the second set of beams to serve the second set of UEs comprises switching from using two beams to serve two UEs to using said two beams to serve one of the two UEs.

7. The method of claim 2, wherein determining whether the load condition satisfies the criteria comprises determining whether a requested amount of baseband resources exceeds available resources of the radio transceiver device.

8. The method of claim 2, wherein the width of one of the P beams is wider than the width of one of the N beams.

9. The method of claim 2, wherein the power allocation of one of the N beams and the power allocation of one of the P beams are different.

10. The method of claim 9, wherein more power is allocated to said one of the P beams than said one of the N beams.

11. The method of claim 2, further comprising switching between using a first set of beams to serve a first set of UEs and using a second set of beams to serve a second set of UEs, wherein one of the first set of beams and the second set of beams is used for uplink reception and the other of the first set of beams and the second set of beams is used for downlink transmission.

12. The method of claim 3, wherein
one of the first set of beams and the second set of beams is used as a current beam set,
the method further comprises obtaining an indication that the current beam set does not meet one or more performance metrics, and
as a result of obtaining the indication that the current beam set does not meet the performance metric, the current beam set is switched from said one of the first set of beams and the second set of beams to another of the first set of beams and the second set of beams.

13. The method of claim 12, wherein the performance metrics relate to at least one of current experienced throughput, channel stationarity, or predicted performance degradation.

14. The method of claim 3, wherein the radio transceiver device comprises power amplifiers and wherein the number of power amplifiers used for the first set of beams and the number of power amplifiers used for the second set of beams are same.

15. The method of claim 3, wherein the radio transceiver device comprises radio chains and wherein the number of radio chains used for the first set of beams and the number of radio chains used for the second set of beams are same.

16. A radio transceiver device, the radio transceiver device comprising:
a transmitter; and
processing circuitry coupled to the transmitter, the processing circuitry being configured to cause the radio transceiver device to:
use N beams to serve a first user equipment (UE), N being a positive integer;
detect a need to serve a second UE;
detect a load condition of the radio transceiver device;
determine whether the load condition satisfies a criteria;
as a result of detecting the need to serve the second UE and determining that the load condition of the radio transceiver device satisfies the criteria, i) reduce the number of beams that are used to serve the first UE, thereby using M beams to serve the first UE, M being a positive integer that is greater than or equal to 1 but smaller than N, and ii) use P beams to serve the second UE, P being a positive integer that is greater than or equal to 1.

17. The radio transceiver device of claim 16, further comprising a memory storing instructions for configuring the processing circuitry to cause the radio transceiver device to reduce the number of beams that are used to serve the first UE, thereby using M beams to serve the first UE and to use P beams to serve the second UE.

18. An access node comprising the radio transceiver device of claim 16.

19. A wireless device comprising the radio transceiver device of claim 16.

20. A computer program product comprising a non-transitory computer readable medium storing a computer program, the computer program comprising computer code which, when run on processing circuitry of a radio transceiver device, causes the radio transceiver device to:
use N beams to serve a first user equipment (UE), N being a positive integer;
detect a need to serve a second UE;
detect a load condition of the radio transceiver device;
determine whether the load condition satisfies a criteria;
as a result of detecting the need to serve the second UE and determining that the load condition of the radio transceiver device satisfies the criteria, i) reduce the number of beams that are used to serve the first UE, thereby using M beams to serve the first UE, M being a positive integer that is greater than or equal to 1 but smaller than N, and ii) use P beams to serve the second UE, P being a positive integer that is greater than or equal to 1.

* * * * *